G. M. CÔTÉ.
RAIL SUPPORT.
APPLICATION FILED MAR. 23, 1908.
939,477. Patented Nov. 9, 1909.
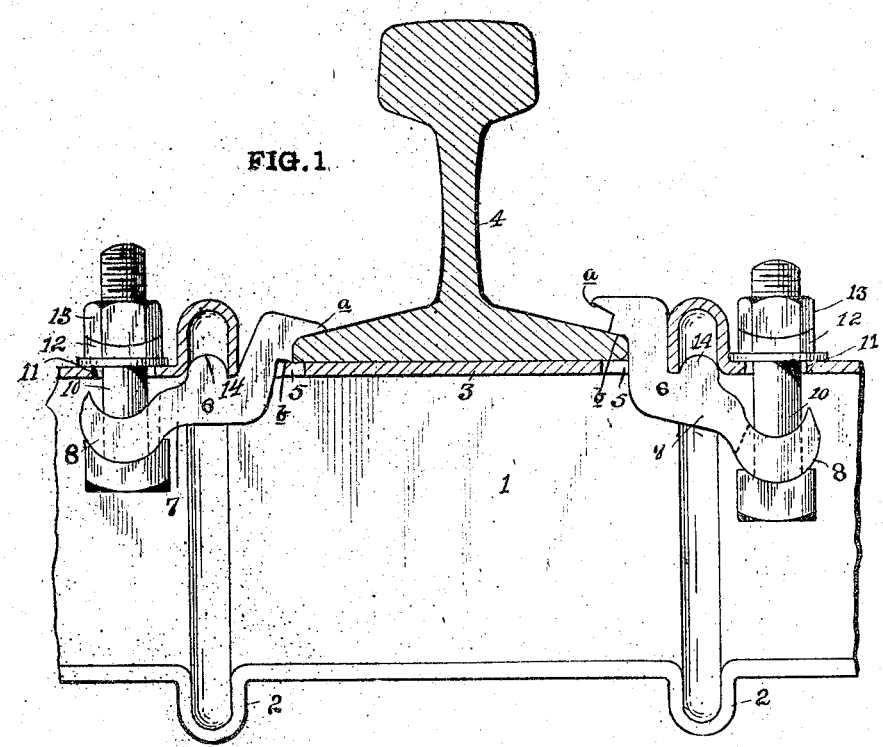
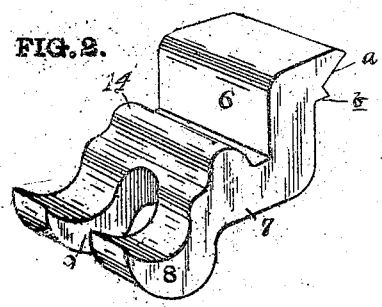
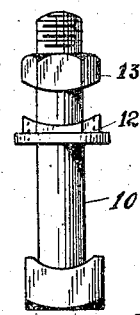
WITNESSES:
INVENTOR
George M Côté
BY Edward A. Lawrence
HIS ATTORNEY

UNITED STATES PATENT OFFICE.

GEORGE M. CÔTÉ, OF PITTSBURG, PENNSYLVANIA, ASSIGNOR TO STANDARD STEEL TIE COMPANY, OF PITTSBURG, PENNSYLVANIA, A CORPORATION OF DELAWARE.

RAIL-SUPPORT.

939,477.      Specification of Letters Patent.      Patented Nov. 9, 1909.

Application filed March 23, 1908. Serial No. 422,580.

*To all whom it may concern:*

Be it known that I, GEORGE M. CÔTÉ, a citizen of the United States, and residing in the city of Pittsburg, in the county of Allegheny and State of Pennsylvania, have invented or discovered new and useful Improvements in Rail-Supports, of which the following is a specification.

My invention consists in certain new and useful improvements in fasteners or means intended to secure railway rails to the cross ties or other support.

It more particularly relates to the general types of fasteners described and claimed by me in Letters Patent No. 839,456 and No. 860,731, and in my patent application, Serial Number 385,896. In these types of fasteners there is provided a downwardly extending arm which passes through a slot in the tie top and is secured to the tie from beneath by means of a securing member or bolt, the tightening of which member firmly clamps the upper portion of the fastener against the rail holding the same in place on the tie. If the engagement of said securing member, hereinafter termed "the bolt," with the fastener or tie, or both, be rigid or unyielding, the thrust and strains exerted on the fastener by the rail and set up by the passing traffic tend to shear off the bolt or strip the threads from the bolt or nut. This is also true where the fastener is of the adjustable type, to allow shifting of the rail for regagement, causing the angle between the lower arm of the fastener and the tie to vary with different adjustments, so that if the bolt be unyielding the strains thereon are not longitudinal. In the case of my invention, the strains on the bolt are entirely longitudinal thereto and all twist or tendency to shear or strip is avoided. To effect these purposes I provide a curved engagement between the bolt and the fastener arm and, preferably, between the bolt and the tie. The engagement between fastener and bolt is such that the fastener may be installed or removed without taking out the bolt but by simply loosening the same. I also provide means whereby the bolt is prevented from turning which would result in its loosening. I also provide means, carried by the fastener arm, which engages the hollow rib or corrugation sometimes provided in the tie top adjacent to the rail platform or portion of the tie top traversed by the rail. By this means such corrugations are stiffened and the engagement of the fastener with the tie improved.

In the accompanying drawings, Figure 1 is a broken longitudinal section of a steel railway tie fitted with my invention holding a rail in place, Fig. 2 is a perspective of the fastener shown in Fig. 1, Fig. 3 is an elevation of the bolt, washer and nut, Fig. 4 is a plan view of the washer, the comparative diameter of the bolt being indicated thereon in dotted lines, and Fig. 5 is a view similar to Fig. 2 showing the fastener with the rib engaging feature omitted.

The following is a description of the drawings. 1 is a box form steel tie having circumferential corrugations or hollow ribs, 2—2, on each side of the rail platform 3. 4 is the rail and 5—5 the fastener slots in the tie top adjacent to each side of the rail platform 3.

6—6 are the fasteners which are shown to be substantially "Z" shaped and of the adjustable type described and claimed by me in Letters Patent No. 860,731. Thus when the rail is first installed, one of said fasteners, such as the left hand fastener in Fig. 1, engages the rail base by means of its upper engaging face, *a*, while the other fastener, the right hand fastener in Fig. 1, engages the rail base by means of its lower engaging face, *b*. When it is desired to shift the rail, the fasteners are loosened and the rail moved, as to the left in Fig. 1, so that when the fasteners are again tightened, the lower engaging face, $b_1$ of the left hand fastener engages the rail base and the upper engaging face, *a*, of the right hand fastener engages the said rail base. The lower arm, 7, of the fastener 6 extends through the slot 5 with an upwardly curved end portion 8, having a concaved upper face and a convex lower face.

9 is a slot extending into said portion 8 and is intended for engagement by the shank of the bolt 10. The bolt 10 is provided with a head having a concaved face adapted to register with the lower convex face of portion 8 of the fastener arm 7. Said bolt extends upwardly through slot 9 in which it fits loosely and through the bolt hole 11 in the tie top, said bolt fitting loosely in said bolt hole 11.

12 is a loosely fitting washer adapted to fit down on the tie top and having its upper face concaved at substantially the same arc as that of the bolt head. The nut 13 adapted to be screwed down on the bolt 10 is provided with a convex lower face adapted to register with the concaved face of the washer 12.

14 is a rounded lip on the upper face of arm 7 of fastener 6 and adapted to engage the interior of hollow rib 2, thus stiffening said rib and obtaining a better engagement for the fastener with the tie. As the angle of said fastener varies with the thrust of traffic and the changed adjustment of the fasteners with the rail, said lip 14 turns in the interior of said rib 2 but does not become entirely disengaged therefrom. Where the fastener is to be used in connection with a tie unprovided with the hollow ribs 2—2, the lip 14 is omitted as shown in Fig. 5. It is evident that the character of engagement between the bolt and the fastener arm prevents the bolt from turning and unloosening itself. It is also evident from the above that whatever the angle of the fastener arm to the tie top, the bolt 10 remains practically vertical as the slot 9 in the fastener arm permits the fastener to adjust itself without disturbing the bolt. The curved engagements of the bolt enable it to swing without torsional strain or shearing tendency and thus enables the fastener to assume thrusts and other movements set up by the passing traffic without fear of fracture. The open ended slot 9 enables the fastener to be installed or removed without taking out the bolt which is a great convenience as the bolt is inserted from below, an inconvenient process when the tie is in place in the track. By simply loosening the nut 13 the fastener may be installed or removed and by tightening the said nut the fastener is clamped firmly against the rail base.

I have shown, for the sake of clearness, my patented adjustable fastener, but it will be understood that the form of engagement between the fastener and the tie is immaterial as far as the use of my present invention is concerned. I therefore do not limit my invention to use in connection with the type of fastener shown but claim it in connection with any type of fastener having a lower arm attachable to the tie.

What I desire to claim is:—

1. In rail supports, a fastener adapted to bear against the rail and a member adapted to pass through a slot in said fastener and secure the same to the tie, the abutting portions of said fastener and said member being in the form of coacting curves, for the purposes described.

2. In rail supports, a fastener adapted to bear against the rail and having an arm adapted to extend through an aperture in the tie and a bolt passing through a slot in the extremity of said arm and secured to said tie, said bolt having a rounded head adapted to engage a reversely rounded face on said arm, for the purposes described.

3. In rail supports, a fastener adapted to bear against the rail and having an arm adapted to extend through an aperture in the tie and a bolt passing through a slot in the extremity of said arm and secured to said tie, the engagement of the bolt with the fastener arm and with the tie being that of coacting curved surfaces, for the purposes described.

4. In rail supports, a fastener adapted to bear against the rail and having an arm adapted to extend through an aperture in the tie, means for securing said arm to the tie and a projection on said arm adapted to engage a recess in said tie, for the purposes described.

5. In rail supports, a fastener adapted to bear against the rail and having an arm adapted to extend through an aperture in the tie, means for securing said arm to said tie and a projection on said arm adapted to engage the hollow rib on said tie, for the purposes described.

Signed at Pittsburg, Penna., this 7th day of March, 1908.

GEORGE M. CÔTÉ.

Witnesses:
GEORGE C. BUELL,
J. H. HARRISON.